J. A. RENSTROM.
GATE.
APPLICATION FILED APR. 5, 1915.
1,164,396.
Patented Dec. 14, 1915.
2 SHEETS—SHEET 2.
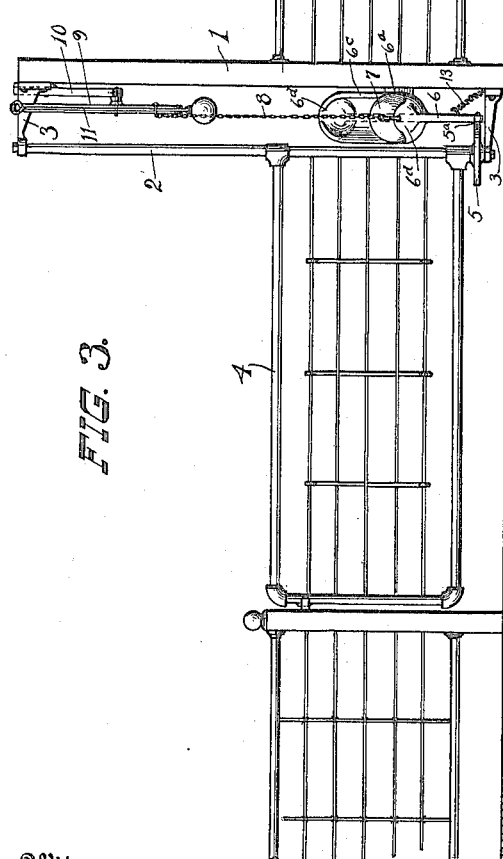
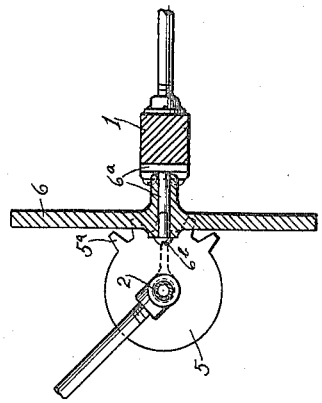
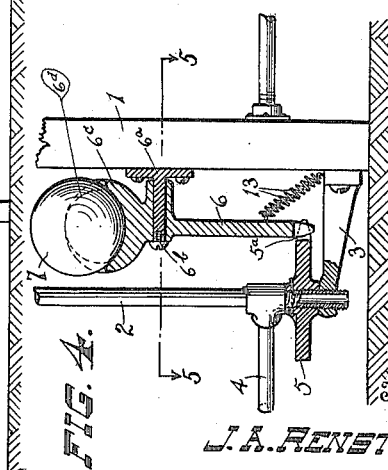
Witnesses
Geo. E. Kricker
F. C. Adams
Inventor
J. A. RENSTROM.
By Fred C. Billman
Attorney

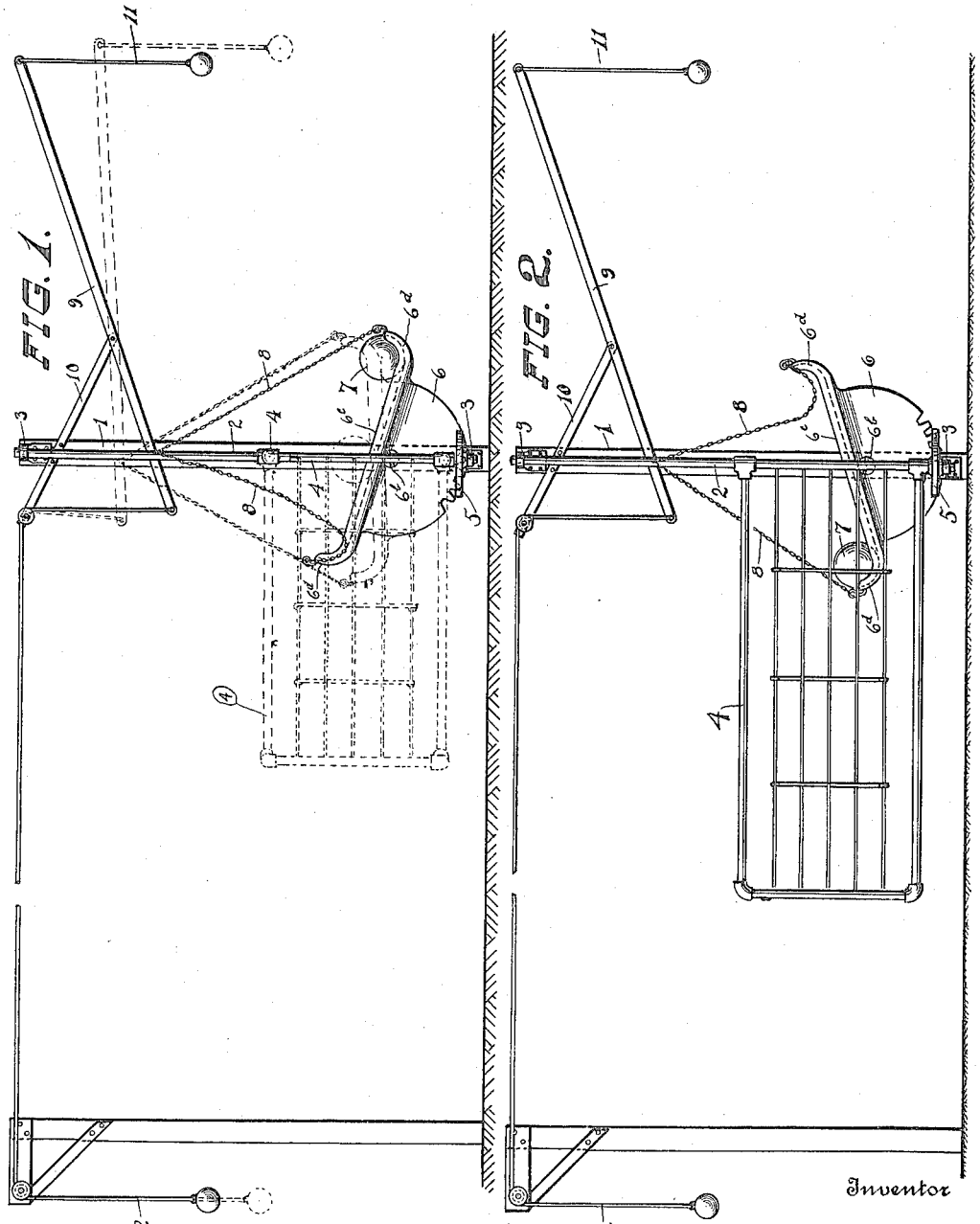

UNITED STATES PATENT OFFICE.

JOHN A. RENSTROM, OF SPOKANE, WASHINGTON.

GATE.

1,164,396. Specification of Letters Patent. Patented Dec. 14, 1915.

Application filed April 5, 1915. Serial No. 19,096.

*To all whom it may concern:*

Be it known that I, JOHN A. RENSTROM, a citizen of the United States, residing at Spokane, in the county of Spokane and State of Washington, have invented certain new and useful Improvements in Gates, of which the following is a specification.

My invention relates to improvements in gates, and more particularly to that class or type of hinged farm gates known as "automatic gates," or in other words, a hinged gate provided with means whereby the same may be opened and closed by the driver of a vehicle without getting out of such vehicle to open and close such gate manually as in the operation of an ordinary gate.

The primary object of the invention is to provide a generally improved automatically operated farm gate which will be exceedingly simple in construction, cheap of manufacture, and efficient in use.

A still further object is the provision of exceedingly simple and efficient actuating mechanism or gearing which not only be adapted for ease of operation, but which will eliminate the danger of breakage or disarrangement of the parts to a minimum.

A still further object is the provision of an improved rocking or counterbalancing gear carrying a reciprocatory ball adapted to carry said rocking gear to its respective inclined positions whereby to fully open and close the connected gate, together with improved flexible actuating mechanism connected to opposite ends of said rocking gear whereby the latter may be swung to its intermediate or neutral position as likewise the gate to which it is attached.

With the above mentioned and other ends in view, the invention consists in the novel construction, arrangement, and combination of parts, hereinafter described, illustrated in the accompanying drawings, and particularly pointed out in the appended claims.

Referring to the accompanying drawings forming a part of this specification, Figure 1, is an end elevation of a closed gate, constructed in accordance with this invention, the dotted lines showing the intermediate position of the gate and gate actuating mechanism when moved to open or close the gate. Fig. 2, a similar view showing the position of the parts when moved to extreme open position. Fig. 3, a side elevation of the gate when closed as in Fig. 1, as viewed from the outer side of the inclosure. Fig. 4, an enlarged vertical sectional view of the ball carrying gate actuating mechanism in neutral position, the gate being in an intermediate or partially open position as indicated in dotted lines in Fig. 1. Fig. 5, a horizontal sectional view on line 5—5 of Fig. 4.

Similar numerals of reference designate like parts throughout all the figures of the drawings.

The improved gate is adapted to be hingedly mounted or attached to a hinge post 1, through the medium of a suitable vertically extending gate sustaining or hanger shaft 2. The gate sustaining shaft or hinge-bar 2, is suitably connected to the hinge post 1, through the medium of hinge bars or brackets 3, said gate sustaining shaft or bar 2, being adapted to support a suitable gate frame 4.

As a means of actuating or moving the improved gate to its respective open and closed positions, the hinged portion of the gate is provided with a horizontal gear 5, the latter, in the present instance, being mounted upon the lower end of the hinge bar or shaft 2, immediately above the lower hinge bar or bracket 3, said gear being provided at one side with a suitable toothed segment $5^a$, meshing with and being adapted to be operated by an improved ball carrying oscillatory or rocking gear 6, the latter, in the present instance, being mounted upon the hinge post 1, through the medium of a suitable bearing bracket $6^a$. The oscillatory or rocking gear 6, may be retained on the bearing portion of the bracket $6^a$, through the medium of a retaining screw $6^b$, or other suitable retaining device.

As a means of carrying the rocking gear 6, to its respective inclined positions whereby to fully open or close the gate, as well as to normally hold said gate in its respective open and closed positions, the upper portion of the rocking gear is provided with a reciprocatory ball 7, said ball 7, being adapted to travel in a ball race-way $6^c$, and to be stopped at the ends of its throw or reciprocation in stop members $6^d$. As a means of moving or rocking said rocking gear 6, from its respective inclined positions, and thereby moving the gate from its open to a closed, or from a closed to an open position, or in other words, moving such rocking gear from its normally inclined position shown in Figs. 1 and 2 of the drawings to a partially horizontal or neutral position indicated by dotted lines in Fig. 1, and in full lines in Figs. 4 and 5 of the drawings, flexible actuating members 8, are connected to opposite ends of the oscillatory or rocking gear 6, in such a manner that upon an upward movement of such flexible actuating members 8, to the dotted line position shown in Fig. 1 said oscillatory or rocking gear 6, will be given a motion to assume a substantially horizontal position and thereby causing the ball 7, to roll toward the opposite end of the rocking gear the weight of such ball carrying the rocking gear 6, and the attached gate, past such neutral position to either a closed position as indicated in Fig. 1, or to an extreme open position as indicated in Fig. 2 of the drawings, it being obvious that when the ball is in either of the positions shown in said Figs. 1 and 2 of the drawings, it will hold the rocking gear 6, in its inclined position as likewise the gate in its respective closed and open positions.

As a convenient means of carrying or actuating the flexible actuating members 8, a lever bar 9, is mounted, in the present instance, on a stationary arm 10, carried by the post 1, said lever member 9, being provided at its outer end with a suitable pendant member 11, adapted to be pulled downwardly to the dotted line position indicated in Fig. 1 by the driver in the vehicle thus moving the rocking gear 6, to the dotted line position there shown, and moving the gate inwardly within the field or inclosure, the ball 7, assuming the reversed position carrying the gate to a fully opened position as indicated in Fig. 2, and upon entrance through the gate the driver upon reaching the opposite cord 12, pulls down upon the same to the dotted line position indicated in Fig. 1 thereby returning the rocking gear and causing the ball to return and thereby carry the gate back to its closed position.

As a means of further counterbalancing the rocking gear 6, and particularly as a means of assisting in returning such rocking gear 6, to its normal or substantially neutral position, a spring 13, is mounted at the rear (see Figs. 3 and 4) said spring depending downwardly and being attached to the hinge post 1, it being obvious that such spring 13, pulling downwardly will assist in returning the rocking gear 6, to its normal or neutral position.

From the foregoing description, taken in connection with the accompanying drawings, the operation and advantages of my invention will be readily understood.

Having thus described one of the embodiments of my invention, what I claim and desire to secure by Letters Patent, is,—

1. In a gate, a hinge post, a gate hinge bar thereon, a gate carried by said hinge bar, a gear on said hinge bar, a rocking gear meshing with said gear and carrying a reciprocatory ball adapted to carry said rocking gear to its respective inclined positions whereby to fully open or close said gate, and flexible actuating members connected to opposite ends of said rocking gear and adapted to swing the same and said gate to an intermediate position.

2. A gate, comprising a hinge post, a gate carrying hinge bar mounted thereon, a gear on said hinge bar, a ball carrying rocking gear on said post in mesh with said gear, a ball adapted to reciprocate above and to carry said rocking gear from a horizontal neutral position to an inclined position, and means for returning said rocking gear to its horizontal and neutral position whereby to reciprocate said ball to an opposite position and carry said rocking gear to its opposite inclined position.

3. In a gate, a gate actuating device comprising a ball carrying rocking race-way provided with a gear operatively connected to and adapted to swing the gate and to hold the latter in an intermediate position when said ball carrying rocking race-way is in a substantially horizontal position, a ball in said ball race-way adapted to reciprocate therein and to carry said race-way to its respective inclined positions, and means for returning said ball race-way from its inclined to its horizontal position whereby to reciprocate said ball to an opposite position and carry said ball race-way and gear to its opposite inclined position.

In testimony whereof I have affixed my signature in presence of two witnesses.

JOHN A. RENSTROM.

Witnesses:
GEORGE C. CRANDALL,
MAY PERKINS.

Copies of this patent may be obtained for five cents each, by addressing the "Commissioner of Patents Washington, D. C."